United States Patent [19]

Mauk et al.

[11] Patent Number: 4,597,426
[45] Date of Patent: Jul. 1, 1986

[54] VEHICLE TIRE AND RIM HAVING TIRE BEAD ROTATABLE INTO ASSEMBLED CONDITION

[75] Inventors: Gerhard Mauk, Wunstorf; Heinrich Huinink, Garbsen; Hans Seitz; Udo Frerichs, both of Langenhagen; Heinz-Dieter Rach, Garbsen; Dionysius Poqué, Aachen, all of Fed. Rep. of Germany

[73] Assignee: Continental Gummi-Werke Aktiengesellschaft, Hanover, Fed. Rep. of Germany

[21] Appl. No.: 554,922

[22] Filed: Nov. 25, 1983

[30] Foreign Application Priority Data

Nov. 27, 1982 [DE] Fed. Rep. of Germany ....... 3244046

[51] Int. Cl.⁴ .............................................. B60B 21/10
[52] U.S. Cl. .................................. 152/379.5; 152/380
[58] Field of Search ... 152/399, 387, 380, 379.3–379.5, 152/362 R

[56] References Cited

U.S. PATENT DOCUMENTS

| 560,660 | 5/1896 | Tomlinson | 152/362 R |
| 4,057,091 | 11/1977 | Gardner et al. | 152/362 R X |
| 4,169,496 | 10/1979 | Cataldo | 152/399 X |
| 4,269,251 | 5/1981 | Harrington et al. | 152/362 R |
| 4,325,422 | 4/1982 | Corner et al. | 152/379.3 X |
| 4,408,647 | 10/1983 | Kuhn et al. | 152/387 X |

FOREIGN PATENT DOCUMENTS

| 0025742 | of 1896 | United Kingdom | 152/375 |
| 2030086 | 9/1979 | United Kingdom | 152/387 |
| 2030087 | 9/1979 | United Kingdom | 152/379.5 |
| 2069421 | 8/1981 | United Kingdom | 152/379.4 |

Primary Examiner—David A. Scherbel
Attorney, Agent, or Firm—Becker and Becker, Inc.

[57] ABSTRACT

In combination, a vehicle wheel which has a rigid, one-part rim, and a belted pneumatic tire having a single-ply or multiple-ply carcass and substantially inextensible and/or tension resistant core rings in the beads. The rim has rim flanges and, adjacent thereto, seating surfaces for the belted tire. To permit simple mounting of the tire, there is proposed that, in the position of the mounted tire, the distance from the center of a core cross-section to the bead edge facing the seating surface is greater than the distance to the axially inner bead edge, so that the core ring is eccentrically mounted in this region of the bead.

8 Claims, 9 Drawing Figures

VEHICLE TIRE AND RIM HAVING TIRE BEAD ROTATABLE INTO ASSEMBLED CONDITION

BACKGROUND OF THE INVENTION

1. Field of the Invention

The present invention relates to a vehicle wheel which has a rigid, one-part rim, and which is adapted to have mounted thereon a belted pneumatic tire having a single-ply or multiply carcass and substantially inextensible and/or tension resistant core rings in the beads; the rim has rim flanges extending substantially inwardly and, adjacent thereto, has seating surfaces on the radially inner circumference for the belted tire. The present invention also relates to a vehicle wheel wherein the rim has rim flanges extending substantially outwardly and, adjacent thereto, has seating surfaces on the radially outer circumference for the belted tire.

2. Description of the Prior Art

A vehicle wheel of the first-described type is known, for example, from German Offenlegungsschrift No. 30 00 428. In this known wheel, recesses are provided adjacent to the rim seating surfaces for the tire beads; such recesses permit the tire to be mounted with one-part rims, in that a portion of one tire bead is initially inserted into such a recess and is then pushed over the rim flange on the opposite side.

For specific purposes, the known recesses may be disadvantageous; for example, if there is desirable to provide the largest possible support faces on the radially outer side of the rim, or to provide a conventional drop or well base.

An object of the present invention is to further develop a vehicle wheel of the aforementioned general type such that the tire may actually be mounted without the known recesses.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
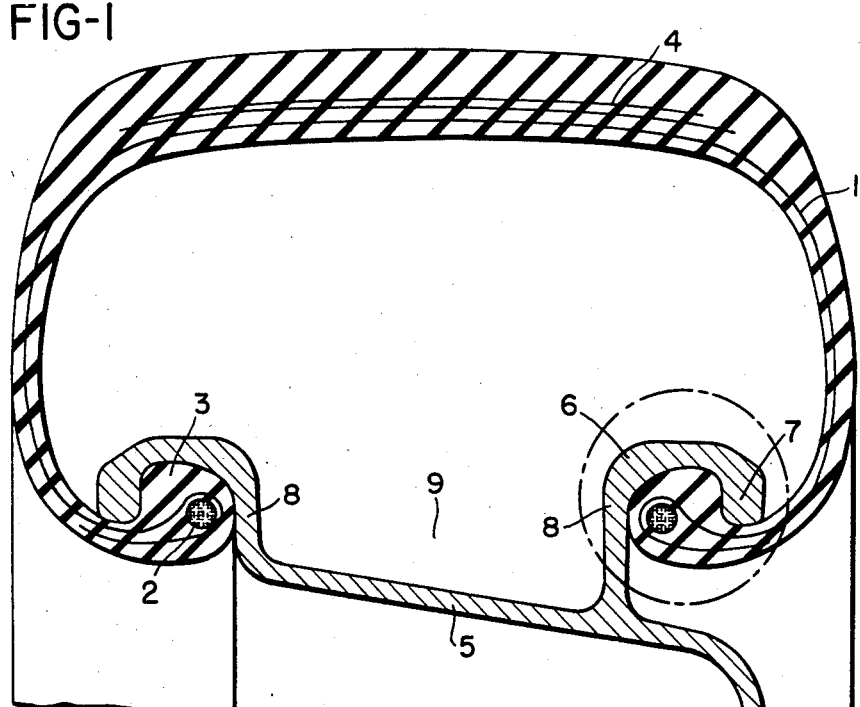
FIG. 1 is a partial, radial section through a vehicle wheel illustrating one embodiment of the present invention.

For tires mounted radially inwardly on the rim, the vehicle wheel of the present invention is characterized primarily in that the central diameter of the core rings is identical to, or slightly larger than, the minimum diameter formed by the inwardly extending rim flanges, and in that, when the tire is in a mounted state thereof, the distance from the center of a core cross-section to the radially outer bead edge is greater than the distance to the axially inner bead edge, so that the core ring is eccentrically mounted in this region of the bead, and so that, during mounting of the tire, the bead is slightly rotatable and/or pivotable.

For tires mounted radially externally on the rim, the vehicle wheel of the present invention is characterized primarily in that the central diameter of the core rings is identical to, or slightly smaller than, the maximum diameter formed by the outwardly extending rim flanges, and in that, when the tire is mounted, the distance from the center of a core cross-section to the radially inner bead edge is greater than the distance to the axially inner bead edge, so that the core ring is eccentrically mounted in this region of the bead, and so that, during mounting of the tire, the bead is slightly rotatable and/or pivotable.

The main concept of the present invention resides in arranging the bead core eccentrically in the bead, i.e. with reference to the directions extending from the center of the core cross-section axially inwardly and to the seating surface when the tire is in its operating position. Within the scope of this invention, "operating position" (=mounted position) should refer to the position of the tire beads relative to the rim; the tire assumes such a position in ready-mounted and inflated state thereof. "Mounting position" should refer to a position of the tire beads pivoted by approximately 90° to the above-described "operating position". The main concept of the present invention is applicable not only to tires mounted radially internally on the rim, but also to tires mounted radially externally on the rim, even though the preferred embodiments provide a tire which is mounted on the radially inner circumference of the rim.

The mounted position of a bead is achieved in that the bead is either pivoted about an axis outside the bead core as a result of movement of side wall portions, or is rotated about an axis through the center of the core cross-section; a further possibility is that the bead is rotated about the core by a relative movement between the core and the bead material surrounding the core, or by a combined movement formed of these three movements.

In the mounting position, the distance from the center of the core cross-section to the bead edge facing the seating surface is shorter than in the operating position, so that the tire diameter in this mounting position and in this region (bead diameter) is smaller or greater, respectively, by double the difference. As a consequence thereof, however, sufficient space is provided between the tire bead and the seating surface of the rim for mounting the tire, which is pivoted back into operating position thereof once the tire bead has been lifted over the rim flanges.

The invention is advantageous in that, with smaller tire sizes, due to there being no need for rim portions to be provided with the recesses, narrower rims may be used, with the result that there is also a reduction in weight.

In the arrangements in which each tire bead on the axially inner side abuts against portions of the rim which extend substantially perpendicularly in cross-section, and in which the space defined by these portions, the seating surface of the rim and the rim flange is substantially occupied in a form-fitting manner, there results the advantage that cover rings for preventing spray water and dirt from entering are not necessary.

Pursuant to further advantageous embodiments of the present invention, each bead, on the axially inner side, may abut against portions of the rim which extend substantially perpendicularly in cross-section; the space defined by these portions, the rim seating surface, and the rim flange may be occupied in a form-fitting manner by the bead.

The tire, in the mounting position, in the radially outer region of the beads, may have a diameter which is smaller than the mean diameter of the rim in the region of the rim seating surfaces by ½ to 3/2 times the diameter of the core cross-section.

The two aforementioned distances of a core center to the bead edges may differ from one another by ¼ to ¾ times the diameter of the core cross-section. The intermediate values for the distances between the two above-mentioned distances, which are perpendicular to each other, may change constantly, so that the bead edge in this region in cross-section extends along a curve. When the tire is mounted, the distance from the center of the core cross-section to the axially externally disposed bead edge may be greater than the distance from the center to the radially externally disposed bead edge. Alternatively, when the tire is mounted, the distance from the center of the core cross-section to the axially externally disposed bead edge may be shorter than the distance from the center to the radially externally disposed bead edge.

The beads may be pivotable and/or slightly rotatable about an axis which extends in the circumferential direction of the tire. The beads may be rotatable about an axis which passes through the center of the core cross-section, such rotation being through an angle in a range of from 45° to 90°. Alternatively, the beads may be rotatable about their core at angles in a range of from 45° to 90°, such rotation being with a relative movement on the contact surface between the core ring and the bead material surrounding said ring.

The tire may have a radial or angular carcass. The tire may have a height to width ratio in a range of from 0.3 to 0.7. The tire may be produced by a casting process. The vulcanization position of the tire with regard to the beads may be located in a region between the mounting position and the operating position of the beads.

The tire may be provided, in its radially inner bead region, with demounting or removal, more particularly a plurality of projections or grooves.

The axially internally disposed portions of the tire beads may be covered by elastically resilient cover or sealing rings.

The rim seating surfaces, at least in part may extend in a straight line in the transverse direction. The portions of the seating surfaces which extend in a straight line may be inclined by up to 10° relative to the horizontal, i.e., the axial direction.

The rim seating surfaces also may extend in a curved manner, preferably in a circular manner, in the transverse direction.

The axially inner surfaces of the rim flanges may assume, at least in part, the function of rim seating surfaces.

A rim may be provided which has in cross-section, adjacent the rim seating surfaces, portions which extend substantially perpendicularly, with the vertical portion of the dish-shaped rim portion extending approximately on a level with one of the rim flanges. The bead present in the other rim flange may be radially inwardly covered by an annular extension portion of the rim ring.

The rim, on its radially outer side, may have a support face which essentially extends from rim flange to rim flange, and extends in a straight or curved inner in the transverse direction.

The present invention also provides a method of mounting a tire on a rim of a wheel of the type previously described. This method is characterized in that, once the rim has been moved into the interior of the tire, one bead is initially pivoted into the mounting position; then, at one location, the bead is completely pushed as far as the rim seating surface and is lifted over the rim flange on the opposite side; subsequently, the tire is centered relative to the rim, and the bead is pivoted into the operating position; finally, an identical procedure is carried out with the second bead.

DESCRIPTION OF PREFERRED EMBODIMENTS

Referring now to the drawings in detail, FIG. 1 shows a vehicle wheel in a mounted state thereof. A belted tire having a radial carcass 1 (an angular carcass also may be used if desired), which carcass is secured in the beads 3 by having the ends thereof looped round the bead cores 2, and said tire having a conventional belt 4, is mounted on a rim 5 in such a manner that the seating surfaces of the beads are disposed on seating surfaces disposed radially inwardly from the rim ring 6 adjacent to the inwardly extending rim flanges 7 on the rim 5.

The tire beads 3, in a substantially form-fitting manner, occupy a space which is defined by the rim flanges 7, the rim seating surfaces, and portions 8 of the rim ring 6 which extend substantially perpendicularly in cross-section. A conventional drop base 9 is formed by the perpendicular portions 8 on the radially outer side of the rim 5; if very wide tires are used, such drop base 9 may serve to move the tire more easily over the one-part rim 5 during mounting.

With the wheel shown in FIG. 1, one tire bead 3, which would have been at considerable risk from an extremely hot brake, or even from a stray spark, is protected by the dish-shaped rim portions 10, which extend axially externally for a long distance on a level with one rim flange 7.

Figure 2:
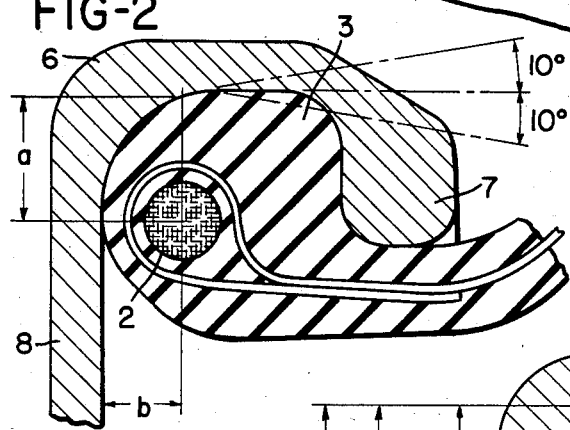
FIG. 2 illustrates a portion of the wheel shown in FIG. 1, showing the tire in its operating position.

FIG. 2 illustrates an enlarged portion of the wheel shown in FIG. 1 in the region of the dot-dash circle. With a wheel as shown in FIGS. 1 and 2, so that a tire actually can be mounted upon a one-part rim 5 which, in contrast to known rims, has no recesses adjacent the rim seating surfaces for the beads 3, there is important for such tire to have the following features. First of all, the bead core 2 is disposed eccentrically in the tire bead 3, so that when the tire is assembled, the distance "a" from the center of the core cross-section to the radially outer bead edge is greater than the distance "b" to the axially inner bead edge. In addition, there is necessary for the tire, in the bead region thereof, to be pivotable or rotatable about an axis, which extends in the circumferential direction of the tire, to such an extent that the tire may assume a mounting position on the rim 5; the tire bead 3, in such a mounting position, is pivoted or rotated by approximately 90° (FIGS. 3 and 4) relative to the operating position. This pivotability or rotatability may be achieved by one or more of the following individual movements. On the one hand, by tightening side wall portions, the bead 3 is pivotable through a specific angle about an axis which is located outside the bead core 2, or even outside the bead 3. In such a case, the pivot angle depends on the length of the side wall of the tire, and on the inner rigidity of such wall. On the other hand, rotation about an axis passing through the center of the core cross-section is possible because the bead 3 is twistable, at intervals, through a specific angle which depends on the properties of the materials and on the structure of the bead core 2 and of the remaining bead 3. Finally, there is made possible to achieve a facilitated rotational movement of the bead 3 about the bead core 2, in that the bead core 2 is embedded in the bead 3 in a non-adhering manner, for example by being wound round with a strip of fabric which—possibly after appropriate prior treatment—prevents adhesion to the adjacent material.

In FIG. 2, there is further indicated that the essential portions of the rim seating surfaces and, due to the form-fitting arrangement, the essential portions also of the bead seating surfaces, may extend in a straight line on the transverse direction, either horizontally or even at an incline, though the incline should not deviate by more than 10° from the horizontal.

Figure 3:
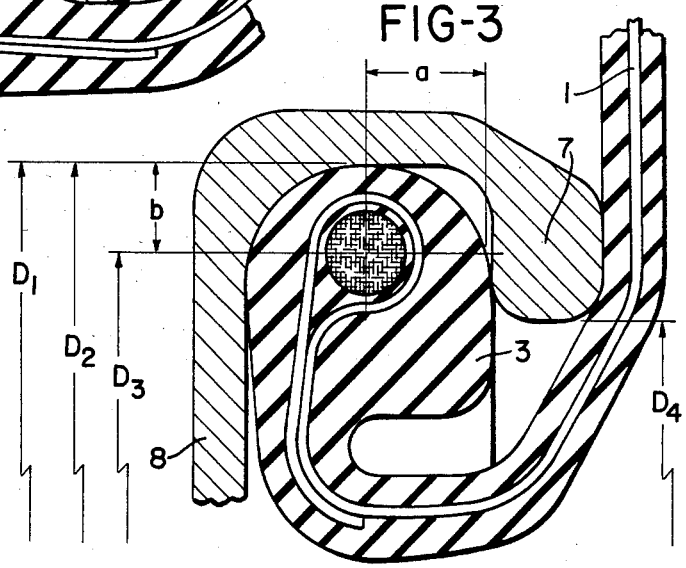
FIG. 3 illustrates a portion of the wheel shown in FIG. 1, showing a tire in its mounting position, with the axes of the rim and the tire being visible.

In the wheel portion shown in FIG. 3, the tire is in a mounting position thereof, in which the beads 3 are pivoted or rotated by approximately 90° relative to the mounted position, so that the region with the distance "b" extends radially outwardly. If the tire diameter in this position and in this region (bead diameter) is denoted by $D_1$, and the mean rim diameter in the region of the seating surfaces is denoted by $D_2$, the equation $D_2 = D_1 + 2(a-b)$ applies. Furthermore, if a tire is selected having a central diameter $D_3$ for the core rings 2, which diameter $D_3$ is identical to, or slightly greater than, the minimum diameter $D_4$ formed by the inwardly extending rim flanges 7 (with the last-mentioned condition, a secure anchoring of the tire behind the rim flanges 7 is achieved, as is a high degree of release reliability), the tire may be mounted in the following manner.

Figure 4:
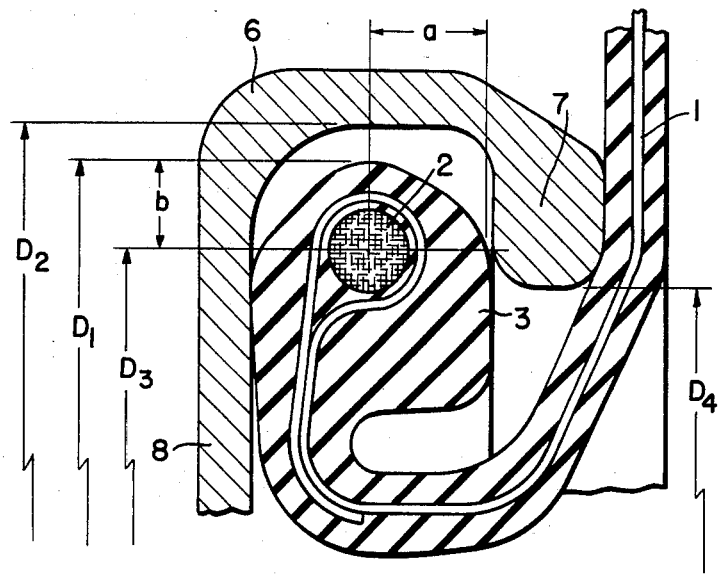
FIG. 4 illustrates the wheel portion shown in FIG. 2, but with the axes of the wheel and the tire not being visible.

Once the rim 5 has been moved into the interior of the tire, with rotational axis thereof perpendicular to the rotational axis of the tire, and has been rotated through 90°, a bead 3 is initially pivoted or rotated through approximately 90°, so that the region with the distance "b" is disposed radially outwardly. The bead 3 is then, at one location, fully inserted into the space, defined by the rim flange 7, the rim seating surface, and the perpendicular rim portion 8 (FIG. 3). This permits the bead 3 to be lifted over the rim flange 7 on the opposite side. Subsequently, the tire is withdrawn so far from the inserted position that the rotational axes of the tire and the rim 5 coincide with one another (FIG. 4). Finally, the bead 3 is pivoted by approximately 90°, so that the bead assumes the operating position (FIG. 2), and a corresponding procedure is effected with the second bead 3.

Experiments have shown that, to permit the tire to be mounted, there is sufficient for the distance "b" to be selected shorter than the distance "a" by, for example, ¼ to ¾ times the diameter of the core cross-section. Thus, with a radial tire of 175 SR 14 size, having a core cross-section diameter of approximately 7 mm, the distances "a" and "b" were so selected that the difference ranged from 2 mm to 5 mm, preferably 3.5 mm.

Figure 5:
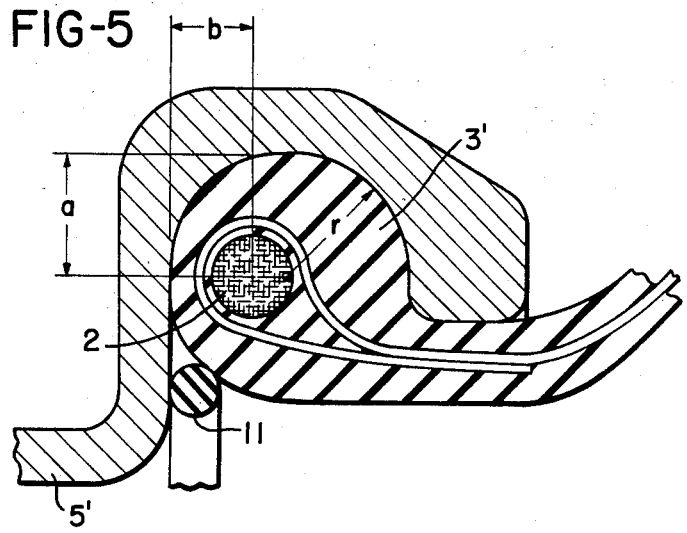
FIG. 5 illustrates a wheel portion having a rim with a curved seating surface.

In FIG. 5, a portion of a wheel is shown which differs above all from the above-described wheel, in that the rim and bead seating surfaces have circular cross-sections. If the radius of the circle is designated "r", the eccentricity of the core 2 embedded in the bead 3' is given by the length "r" - "b", and the equations "r" - "b" × "a" - "b" applies. With regard to mounting the tire, the same comments apply here as were given for the wheel shown in FIGS. 1 to 4. Additionally, with the wheel shown in FIG. 5, an elastically resilient sealing ring 11 is provided which serves to repel pray water and dirt, and which also may be adapted, by means of appropriate rigidity, in such a way that in an emergency such sealing ring 11 blocks the tire bead 3' in an irreversible manner and thereby prevents the bead 3' from becoming released from the rim 5'.

Figure 6:
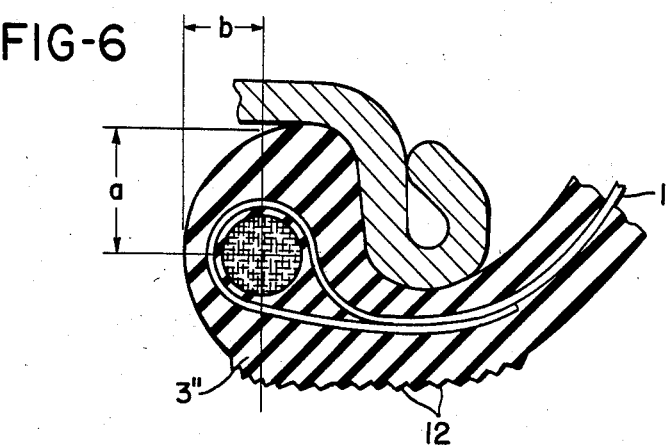
FIG. 6 illustrates a wheel portion having a tire wherein, in operating position thereof, the distance from the center of the core cross-section to the axially outer bead edge is shorter than the distance to the radially outer bead edge.

The wheel shown in FIG. 6 differs mainly from the wheel shown in FIG. 5 in that, when the tire is in a mounted position thereof, the distance from the center of the core cross-section to the axially externally disposed bead edge is shorter than the distance "a" from the center to the radially externally disposed bead edge. In addition, projections 12 are provided in the bead region 3", and possibly in the adjacent region, on the radially inner side of the tire; these projections 12 serve to facilitate removal of the tire.

Easier removal of the tire also may be achieved, in that the tire is not vulcanized, as is usually the case, in a position which corresponds to the operating position on the rim, but is vulcanized in a position which, with regard to the beads 3, 3', and 3", is between the operating position and the mounting position. A vulcanization position with beads 3, 3', and 3" pivoted through approximately 45° has proved particularly advantageous. Such a tire is relatively easy to move into the mounting position, and automatically rotates into an operating position thereof when inflated with air.

Such a tire is especially advantageous, however, in that, because of the initial tension in the region of the beads 3, 3', and 3", the tire automatically leaves the operating position thereof if there is a loss of air, and may be removed without much force.

Figure 7:
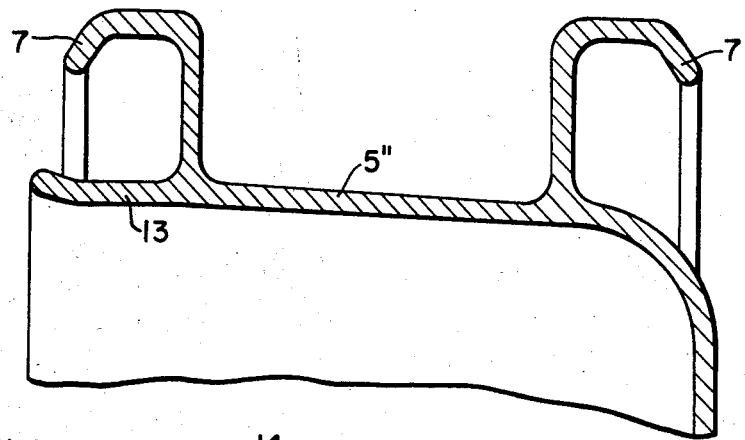
FIG. 7 is a partial, radial section through a rim having regions covered on both sides for the tire beads.

A further preferred rim form 5" is shown in FIG. 7 and differs from the rim form shown in FIG. 1 in that the tire bead (not shown) present in the second rim flange 7 is also covered by an annular extension portion 13 in a radially inward direction. The rim flanges 7, which are set inclined inwardly and, in part, assume the function of rim seating surfaces, constitute an additional difference. In this context, the term "inclined inwardly" signifies that the rim flanges do not extend exactly radially inwardly, but are disposed in a direction which can be formed by a radial component and an axially outwardly extending component.

Figure 8:
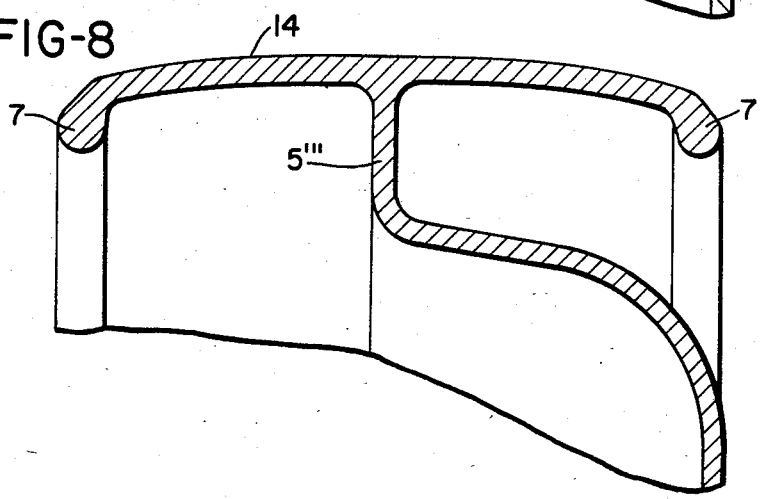
FIG. 8 illustrates a rim having an optimum support face radially externally.

FIG. 8 illustrates a rim 5''', wherein the radially outer support faces 14 are optimized for an emergency compared with the above-described rims 5, 5', and 5". The rim 5''' extends radially outwardly in the transverse direction in a slightlycurved manner so that, in practical terms, an entire outer surface thereof acts as a support face 14.

There has already been stated that, for the wheel according to the invention, not only tires with a radial carcass, but also tires with an angular or biased carcass may be used. The rim flanges disposed in the tire interior, and the long travel strokes produced thereby for the tire, permit tires to be used which have extremely small cross-sections, the height to width ratio of which may be in a range between 0.3 and 0.7 [usual definition of H (height) and W (width)]. Because of the simplified tire construction, in particular in the region of the less stressed beads, a casting process is used for the manufacture of the tire. There is also possible, of course, to combine individual components of the tires or rims of the various drawing illustations with one another. Finally, mention should be made of the fact that the invention also may be used for angular or bias ply tires which have no belts.

Figure 9:
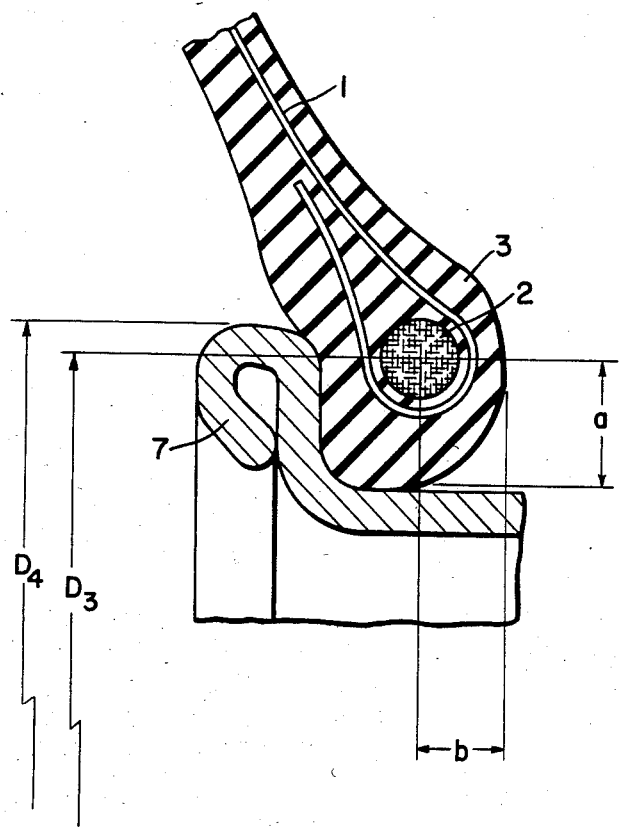
FIG. 9 is a partial, radial section through a vehicle wheel, wherein the tire beads are disposed radially externally on the rim.

In FIG. 9, a vehicle wheel is shown in a partial, radial cross-sectional view in the region of one tire bead 3. In the above examples shown in FIGS. 1 to 8, the tire beads 3 are disposed radially internally on the rim; in contrast, with the wheel shown in FIG. 9, the tire beads 3 are disposed radially externally adjacent radially outwardly extending rim flanges 7.

In order to allow the eccentric effect to occur here also to eliminate recesses for mounting, the tire diameter in the region of the beads 3 needs to be enlargeable by the rotational movement of the beads 3 during mounting, so that the tire bead 3 can be lifted over the rim flange 7 once a portion of the circumference of a bead 3 has been placed upon the associated rim seating surface on the opposite side. All of the other features regarding the structure of the tire and the rim are identical to those mentioned in connection with the above examples.

The present invention is, of course, in no way restricted to the specific disclosure of the specification and drawings, but also encompasses any modifications within the scope of the appended claims.

What we claim is:

1. In combination, a vehicle wheel which has a rigid one-part rim, and a belted pneumatic tire which is adapted to be mounted on said rim; said tire having a carcass including a wall portion, two beads having bead edges, and in each bead a substantially inextensible core ring having a center of a cross-section thereof; said rim being provided with rim flanges having a minimum diameter and, adjacent thereto, having seating surfaces of the rim for said belted tire in assembled relation thereto; said rim flanges of said rim extending substantially radially inwardly; said rim having a radially inner periphery, with said seating surfaces of said rim for said tire being disposed adjacent to said rim flanges on said radially inner periphery; the improvement therewith comprising:

a central diameter of said core rings corresponding approximately to the minimum diameter of said rim flanges; in the mounted state of said tire as assembled on said rim, the distance "a" from the center of the cross-section of a given one of said core rings to that head edge of the associated bead which faces the associated seating surface of the rim being greater than the distance "b" to the axially inner bead edge of that bead; so that during assembly said ssociated bead is rotated relative to the corresponding seating surface of the rim, and so that, during mounting of said tire when assembly further relative to the corresponding seating surface of the rim, said bead is slightly rotatable and/or pivotable in a 90° rotation from radial orientation into axial orientation of said bead edges so that the wall portion of said carcass in assembled condition is radially inwardly of said rim flanges.

2. A combination according to claim 1, in which said rim has a main portion which extends substantially parallel to the axial direction of said wheel, and two further portions respectively associated with, and disposed axially inwardly of, said rim flanges; each of said further portions extending essentially at right angles to said main rim portion, and being connected to a given one of said rim flanges by a respective third portion, each of which is provided with said radially inner periphery of said rim on which said seating surfaces for said tire are disposed; the axially inner side of each bead abuts, in the mounted state of said tire, against one of said further rim portions; each further rim portion, seating surface, and rim flange define a space which is occupied in a form-fitting manner by a given one of said beads in the mounted state of said tire.

3. A combination according to claim 1, in which said distance "a" and said distance "b" differ from one another by an amount ranging from ¼ to ¾ times the diameter of a cross-section of a given one of said core rings.

4. A combination according to claim 1, in which said beads are at least one of pivotable and slightly rotatable about an axis which extends in the circumferential direction of said tire; said beads being respectively rotatable about an axis which passes through the center of the cross-section of the associated one of said core rings, with such rotation being through an angle in a range of from 45° to 90°; said beads thus being rotatable about their associated core rings at angles in a range of from 45° to 90°, with such rotation being accompanied by a relative movement at a contact surface between said core ring and the surrounding bead material.

5. A combination according to claim 1, in which said tire has a height to width ratio in a range from 0.3 to 0.7.

6. A combination according to claim 1, in which the vulcanization position of said tire with regard to said beads is located in a region between the mounting position and the operating position of said beads.

7. A method of mounting a tire on the rim of a wheel for a combination, including a vehicle wheel which has a rigid one-part rim, and a belted pneumatic tire which is adapted to be mounted on said rim; said tire having a carcass including a wall portion, two beads having bead edges, and in each bead a substantially inextensible core ring having a center of a cross-section thereof; said rim being provided with rim flanges having a minimum diameter and, adjacent thereto, having seating surfaces of the rim for said belted tire in assembled relation thereto; said rim flanges of said rim extending substantially radially inwardly; said rim having a radially inner periphery, with said seating surfaces of said rim for said tire being disposed adjacent to said rim flanges on said radially inner periphery; a central diameter of said core rings corresponding approximately to the minimum diameter of said rim flanges; in the mounted state of said tire as assembled on said rim, the distance "a" from the center of a cross-section of a given one of said core rings to that bead edge of the associated bead which faces the associated seating surface of the rim being greater than the distance "b" to the axially inner bead edge of that bead; so that during assembly said associated lead is rotated relative to the corresponding seating surface of the rim, and so that, during mounting of said tire when assembling further relative to the corresponding seating surface of the rim, said bead is slightly rotatable and/or pivotable in 90° rotation from radial orientation into axial orientation of said bead edges so that the wall portion of said carcass in assembled condition is radially inwardly of said rim flanges; the improvement therewith which includes the steps of: moving said rim into the interior of said tire; initially pivoting one of said beads into the mounting position; at one location completely pushing said last-mentioned bead as far as said seating surface of the rim for said tire and lifting it over the rim flange on the opposite side; subsequently centering said tire relative to said rim; pivoting said bead into the operating position; and carrying out the same procedure for the other one of said beads.

8. In combination, a vehicle wheel which has a rigid one-part rim, and a belted pneumatic tire which is adapted to be mounted on said rim; said tire has a single or multi-ply carcass including a wall portion, two beads having bead edges, and in each bead a substantially inextensible and/or tension resistant core ring having a center of a cross-section thereof; said rim being provided with rim flanges which have a minimum diameter and which extend substantially radially inwardly; said rim having a radially inner periphery, with seating surfaces of the rim for said tire being disposed adjacent to said rim flanges on said radially inner periphery; the improvement therewith which comprises:

a central diameter of said core rings that is at least equal to the minimum diameter formed by said inwardly extending rim flanges; in the mounted state of said tire as assembled on said rim, the distance "a" from the center of the cross-section of a given one of said core rings to the radially outer bead edge of the associated bead being greater than the distance "b" to the axially inner bead edge of that bead, so that said associated bead is rotated relative to the corresponding seating surface of the rim, and so that, during mounting of said tire when assembling further relative to the corresponding seating surface of the rim, said bead is slightly rotatable and/or pivotable in 90° rotation from radial orientation into axial orientation of said bead edges so that the wall portion of said carcass in assembled condition is radially inwardly of said rim flanges.

* * * * *